United States Patent
Sha et al.

(10) Patent No.: US 12,288,480 B2
(45) Date of Patent: Apr. 29, 2025

(54) ARTIFICIAL INTELLIGENCE-DRIVEN AVATAR-BASED PERSONALIZED LEARNING TECHNIQUES

(71) Applicant: Dell Products L.P., Round Rock, TX (US)

(72) Inventors: Danqing Sha, Shanghai (CN); Zijia Wang, WeiFang (CN); Eric Bruno, Shirley, NY (US); Amy Seibel, Newton, MA (US); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 177 days.

(21) Appl. No.: 17/580,960

(22) Filed: Jan. 21, 2022

(65) Prior Publication Data
US 2023/0237922 A1    Jul. 27, 2023

(51) Int. Cl.
*G09B 5/06*    (2006.01)
*G06N 20/00*    (2019.01)
(Continued)

(52) U.S. Cl.
CPC ............ *G09B 5/065* (2013.01); *G06N 20/00* (2019.01); *G06V 40/174* (2022.01); *G06V 40/20* (2022.01); *G06V 40/70* (2022.01)

(58) Field of Classification Search
CPC ...... G09B 5/065; G06N 20/00; G06V 40/174; G06V 40/20; G06V 40/70
See application file for complete search history.

(56) References Cited

U.S. PATENT DOCUMENTS 9,530,326 B1 * 12/2016 Ramloll .............. G09B 5/02
2005/0054381 A1 * 3/2005 Lee .................... G06F 9/451
455/557
(Continued)

OTHER PUBLICATIONS github.com, SimpleHTR: Handwritten Text Recognition (HTR) system implemented with TensorFlow, https://github.com/githubharald/SimpleHTR , accessed Jan. 20, 2022.
(Continued)

*Primary Examiner* — Sing-Wai Wu
*Assistant Examiner* — Khoa Vu
(74) *Attorney, Agent, or Firm* — Ryan, Mason & Lewis, LLP

(57) ABSTRACT

Methods, apparatus, and processor-readable storage media for artificial intelligence-driven avatar-based personalized learning techniques are provided herein. An example computer-implemented method includes obtaining multiple forms of input data from user devices associated with a user in a virtual learning environment; determining status information for user variables by processing at least a portion of the multiple forms of input data using a first set of artificial intelligence techniques; determining instruction-related modifications for the user by processing, using a second set of artificial intelligence techniques, at least a portion of the multiple forms of input data and at least a portion of the determined status information; implementing, based on the determined instruction-related modifications, modifications to an instructor avatar with respect to the user in the virtual learning environment; and performing one or more automated actions based on user response to the implemented modifications to the instructor avatar.

20 Claims, 7 Drawing Sheets

(51) Int. Cl.
*G06V 40/16* (2022.01)
*G06V 40/20* (2022.01)
*G06V 40/70* (2022.01)

(56) References Cited

U.S. PATENT DOCUMENTS

| | | | |
|---|---|---|---|
| 2016/0005320 A1* | 1/2016 | deCharms | G09B 19/00 |
| | | | 434/236 |
| 2018/0203238 A1* | 7/2018 | Smith, Jr. | G02B 27/017 |
| 2018/0308473 A1* | 10/2018 | Scholar | A63F 13/00 |
| 2019/0204907 A1* | 7/2019 | Xie | G06F 3/017 |
| 2019/0236968 A1* | 8/2019 | Otwell | G09B 5/02 |
| 2020/0335001 A1* | 10/2020 | Freiwirth | H04L 67/131 |
| 2021/0052215 A1* | 2/2021 | Mouton | G16H 50/20 |
| 2021/0403004 A1* | 12/2021 | Alvarez | G06V 20/597 |

OTHER PUBLICATIONS

Robles, P., Programmable Web, Baidu Offers Up Free OCR API, Sep. 25, 2015.

U.S. Appl. No. 17/566,186, filed Dec. 30, 2021, titled "Machine Learning-Based Educational Content Adaptation Based on User Personal Characteristics.".

* cited by examiner

ARTIFICIAL INTELLIGENCE-DRIVEN AVATAR-BASED PERSONALIZED LEARNING TECHNIQUES

FIELD

The field relates generally to information processing systems, and more particularly to education-related techniques using such systems.

BACKGROUND

Student populations are increasingly diverse in terms of culture, location, economic background, learning styles, etc. Conventional education approaches are often static in that majorities of students take the same courses and the same corresponding assessments and/or exams. However, such static approaches offer limited personalization or customization for students with different needs, learning progress, learning styles, etc.

Additionally, translating conventional education approaches to remote and/or virtual settings often presents additional challenges. For example, participants are commonly required or suggested to turn on their cameras during course sessions, which may cause privacy and/or security issues (e.g., if the training or meeting platform does not have sufficient encryption and identity authentication). Also, not all participants may be willing and/or comfortable turning-on their camera due to one or more privacy concerns. Moreover, even with all participant cameras turned on, it is difficult for teachers to effectively monitor every student's engagement status.

SUMMARY

Illustrative embodiments of the disclosure provide techniques for artificial intelligence-driven avatar-based personalized learning techniques. An exemplary computer-implemented method includes obtaining multiple forms of input data from one or more user devices associated with a user in a virtual learning environment, and determining status information for one or more user variables by processing at least a portion of the multiple forms of input data using a first set of one or more artificial intelligence techniques. The method also includes determining one or more instruction-related modifications for the user by processing, using a second set of one or more artificial intelligence techniques, at least a portion of the multiple forms of input data and at least a portion of the determined status information. Further, the method includes implementing, based at least in part on the one or more determined instruction-related modifications, one or more modifications to at least one instructor avatar with respect to the user in the virtual learning environment, and performing one or more automated actions based at least in part on user response to the one or more implemented modifications to the at least one instructor avatar.

Illustrative embodiments can provide significant advantages relative to conventional education approaches. For example, problems associated with security and/or privacy concerns, as well as student engagement limitations, are overcome in one or more embodiments through implementing dynamic artificial intelligence-driven avatar-based personalized learning techniques.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
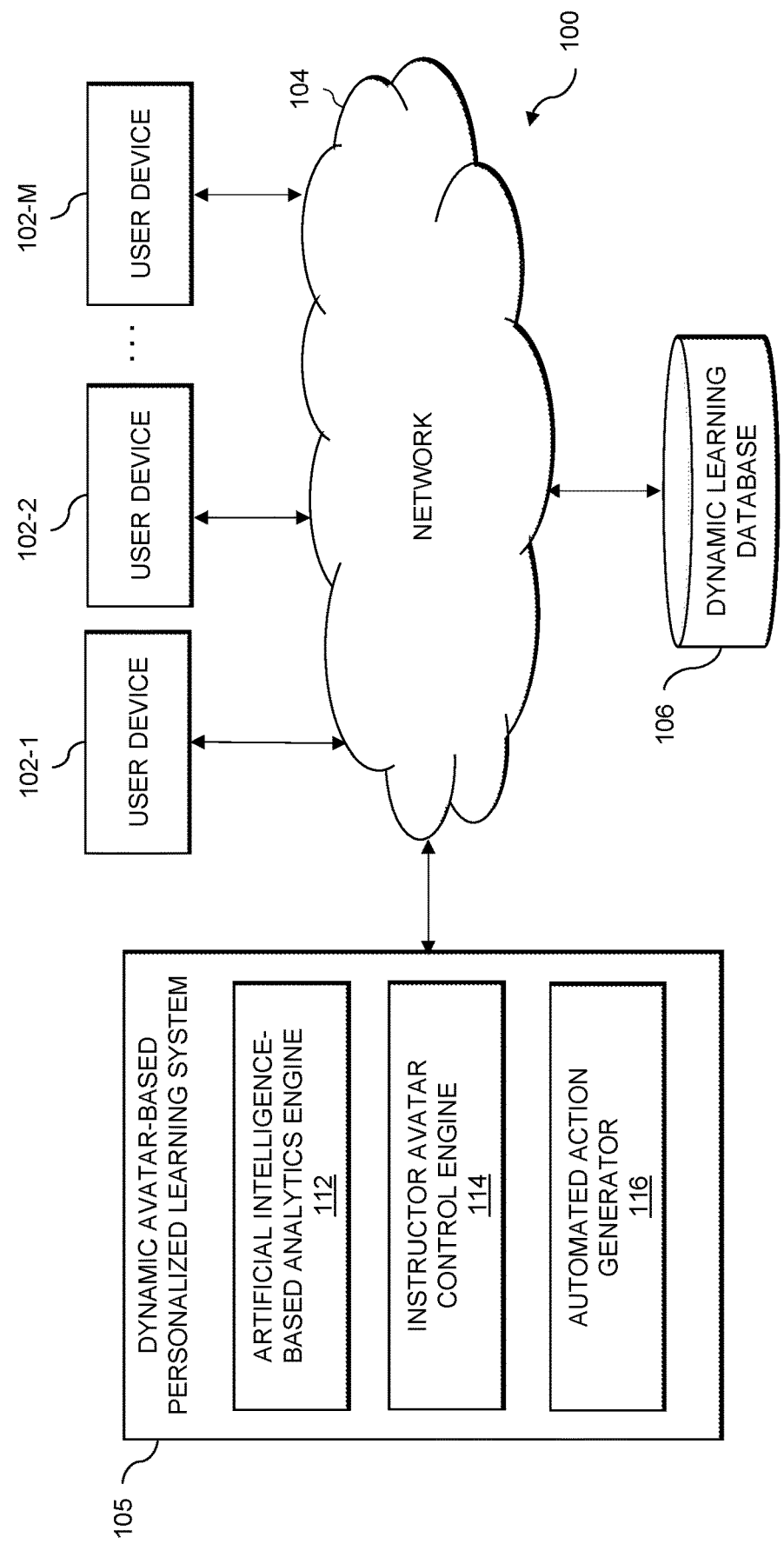
FIG. 1 shows an information processing system configured for artificial intelligence-driven avatar-based personalized learning techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the FIG. 1 embodiment. Also coupled to network 104 is dynamic avatar-based personalized learning system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, dynamic avatar-based personalized learning system 105 can have an associated dynamic learning database 106 configured to store data pertaining to student characteristics and variables, which comprise, for example, preferences, learning outcomes, learning progress, historical information, etc. Dynamic learning database 106 can also be configured to store instruction and/or course data, which comprise, for example, educational content pertaining to one or more courses, historical teaching data pertaining to one or more courses, etc.

The dynamic learning database 106 in the present embodiment is implemented using one or more storage systems associated with dynamic avatar-based personalized learning system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with dynamic avatar-based personalized learning system 105 are one or more input-output devices, which illustratively comprise keyboards, displays or other types of input-output devices in any combination. Such input-output devices can be used, for example, to support one or more user interfaces to dynamic avatar-based personalized learning system 105, as well as to support communication between dynamic avatar-based personalized learning system 105 and other related systems and devices not explicitly shown.

Additionally, dynamic avatar-based personalized learning system 105 in the FIG. 1 embodiment is assumed to be implemented using at least one processing device. Each such processing device generally comprises at least one processor and an associated memory, and implements one or more functional modules for controlling certain features of dynamic avatar-based personalized learning system 105.

More particularly, dynamic avatar-based personalized learning system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows dynamic avatar-based personalized learning system 105 to communicate over the network 104 with the user devices 102, and illustratively comprises one or more conventional transceivers.

The dynamic avatar-based personalized learning system 105 further comprises artificial intelligence-based analytics engine 112, instructor avatar control engine 114, and automated action generator 116.

It is to be appreciated that this particular arrangement of elements 112, 114 and 116 illustrated in dynamic avatar-based personalized learning system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for artificial intelligence-driven avatar-based personalized learning techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, dynamic avatar-based personalized learning system 105 and dynamic learning database 106 can be on and/or part of the same processing platform.

An exemplary process utilizing elements 112, 114 and 116 of an example dynamic avatar-based personalized learning system 105 in computer network 100 will be described in more detail with reference to the flow diagram of FIG. 5.

Accordingly, at least one embodiment includes artificial intelligence-driven avatar-based personalized learning techniques. As detailed herein, using one or more embodiments, artificial intelligence-driven avatar instructors and/or tutors can act as a personalized teacher for each of one or more students, interacting with such students uniquely, customizing instruction to each given student based at least in part on the student's specific needs, learning progress, learning style, etc.

At least one embodiment includes obtaining and processing (e.g., in approximately real-time), in connection with at least one artificial intelligence-based instructor/teacher avatar, status information pertaining to emotion indications and/or motion indications for each of one or more students. Based at least in part on such processing, the at least one artificial intelligence-based instructor avatar can, in connection with each respective student, answer one or more questions, adjust one or more lessons and/or methods of instruction to adapt the learning material to one or more preferences, interests, and/or learning outcomes of the given student.

Additionally, in one or more embodiments, real-time feedback and interaction can enable students to ask questions through text, images, and/or voice input, and obtain prompt and/or immediate responses from the artificial intelligence-based instructor avatar. At least one sensing system (e.g., at least one camera and/or one or more other sensors) can be implemented in connection with each student system and can transmit real-time student data for the artificial intelligence-based instructor avatar to learn and/or process the student's emotions, motion and/or activity, etc. in real-time, thereby enabling dynamic adjustments and/or actions to improve the student's learning experience. Detecting student engagement can be carried out, for example, using components and models such as further detailed in connection with FIG. 2, and/or one or more of the techniques disclosed in U.S. patent application Ser. No. 17/451,907, filed Oct. 22, 2021 and entitled "Intelligent and Adaptive Measurement System for Remote Education," which is incorporated by reference herein in its entirety.

In at least one embodiment, an artificial intelligence-based instructor avatar can be deployed in at least one edge device (e.g., an edge device used by the instructor at a given remote location in a virtual learning environment). Further, by utilizing an artificial intelligence-based instructor avatar such as detailed herein, one or more embodiments can include enabling customized one-on-one teaching for each student (even among a class setting comprising multiple students), as the artificial intelligence-based instructor avatar will automatically interact with each student uniquely based on various characteristics and detected status variables of the given student. Additionally, such an embodiment can include automatically learning, via the artificial intelligence-based instructor avatar, one or more patterns and/or preferences of each student, which can be used to further train the artificial intelligence-based instructor avatar to create an increasingly unique and/or effective learning environment for the student.

Figure 2:
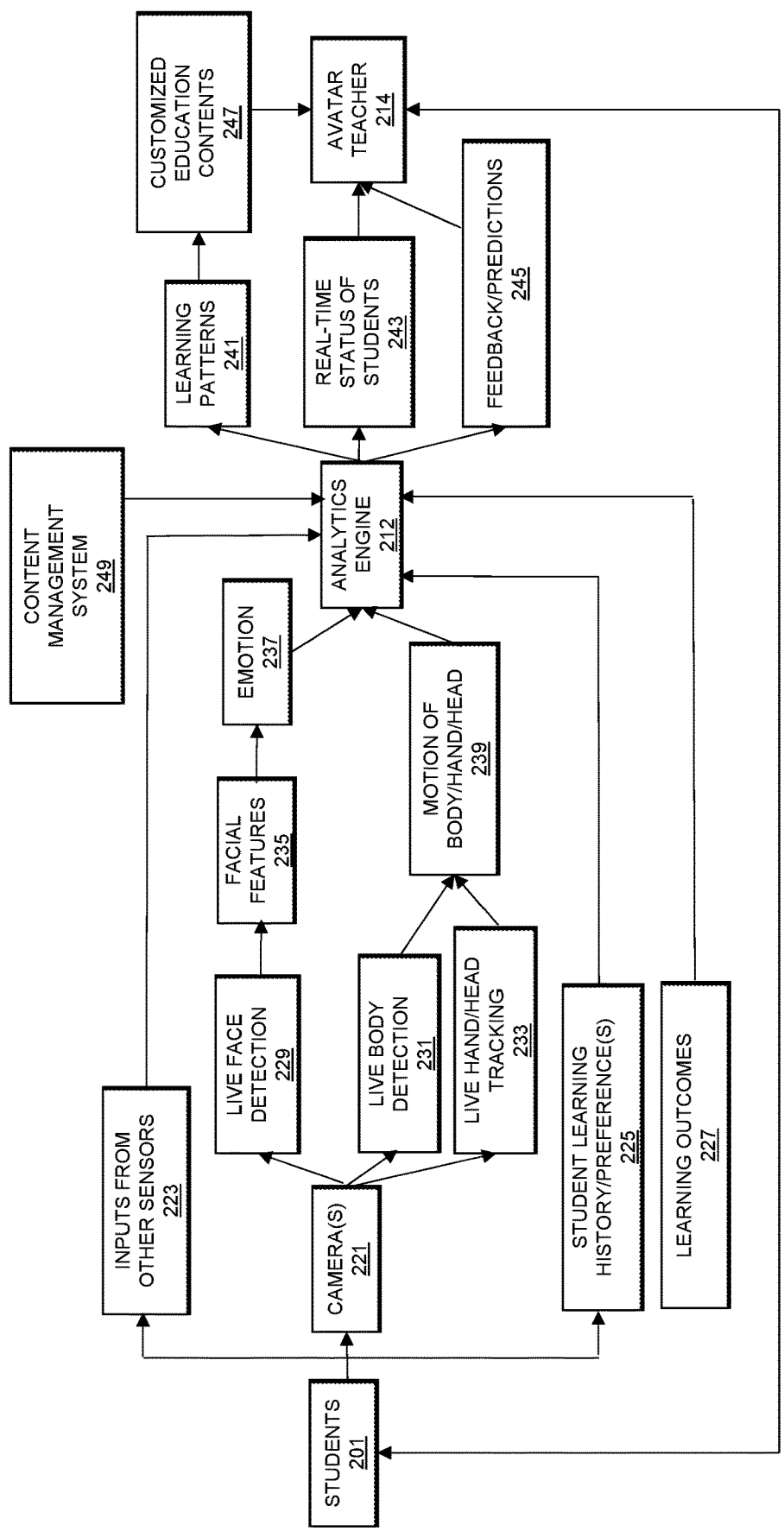
FIG. 2 shows an example system architecture for an illustrative embodiment.

FIG. 2 shows an example system architecture for an illustrative embodiment. By way of illustration, as depicted in FIG. 2, each student 201 can have a few sensors installed on or around him or her, and/or wearable devices, such as a camera 221, physiological sensors, etc. to capture various forms of real-time student data (which can include data 223 from one or more non-camera sensors). As illustrated in FIG. 2, camera 201 can capture video and/or image data of the student 201, and provide at least a portion of such data to a live face detection component 229, a live body detection (e.g., skeleton tracking) component 231, and a live hand and/or head tracking component 233. The live face detection component 229 determines one or more facial features 235 of the student 201, and uses such determined features to identify one or more emotional states 237 attributable to the student. Additionally, live body detection component 231 and live hand and/or head tracking component 233 can be implemented to determine motion data 239 for the student's body, head, and/or hand.

By way of example, in one or more embodiments, one or more computer vision algorithms can be implemented by live face detection component 229 to detect the student's face expression(s), and one or more computer vision algorithms can also be implemented by live body detection component 231 and live hand and/or head tracking component 233 to detect the student's hand, body, and/or head movements. In such an embodiment, with respect to the one or more computer vision algorithms, machine learning algorithms such as those built into libraries such as OpenCV, which is built upon TensorFlow for artificial intelligence/machine learning and image processing, can be used.

As also depicted in FIG. 2, other engagement measuring components can include student learning attributes 225 (which can include, e.g., historical performance, student background information, student preferences, etc.) as well as learning outcome information 227 (which can include, e.g., information pertaining to time spent learning, repeat usage, etc.).

Artificial intelligence-based analytics engine 212 processes at least a portion of the outputs generated by elements 223, 237, 239, 225 and/or 227 to determine one or more student learning patterns 241, to determine and/or understand real-time status information 243 (e.g., emotional status and/or level of engagement with the instruction), generate one or more items of feedback and or recommendation 245 for the student, and/or one or more predictions for future student performance. In at least one embodiment, algorithms and/or machine learning models used to provide analytics (in connection with the artificial intelligence-based analytics engine 212) can be trained on sample data relevant to the learning environment of the given student, using reinforced learning wherein sample outputs will also be provided. Additionally, based at least in part on processing such inputs in addition to inputs from content management system 249, the artificial intelligence-based analytics engine 212 can generate personalized educational content for the student. As used herein, content management system 249 can be used to efficiently store, index, and/or search for and/or identify relevant learning material for one or more relevant education topics.

More specifically, in at least one example embodiment, the artificial intelligence-based analytics engine 212 can generate and/or output one or more determined learning patterns 241 attributable to the student, which can be used to identify and/or create customized educational content 247 for the student 201 (which the instructor avatar control engine 214 can present and/or provide to the student 201 in the student's preferred style and/or in accordance with one or more student preferences). Additionally, the artificial intelligence-based analytics engine 212 can generate and/or output real-time status information 243 associated with the student 201 (e.g., emotional status information, motion-based status information, etc.)

Accordingly, during an instruction session, the artificial intelligence-based instructor avatar can determine (approximately) real-time motion and emotion status information from the student and provide one or more interactions and/or items of feedbacks to the student in response thereto. In one or more embodiments, the student can also raise a question via text, speech, and/or uploading images and/or video content, and the artificial intelligence-based instructor avatar can process the question, generate a response, and provide the response to the student via text, speech, image(s), video(s), or a combination thereof (e.g., in accordance with one or more student preferences).

To detect the real-time status of students, various data can be measured by one or more sensors (e.g., one or more Internet of Things (IoT) sensors), wherein at least a portion of such data can be provided as input and processed by an artificial intelligence-based analytics engine associated with at least one artificial intelligence-based instructor avatar. In one or more embodiments, such data can include camera-based student motion and/or emotion detection, physiological data, sound and/or voice detection, presence detection, etc.

By way of example, in such an embodiment, one or more computer vision algorithms (within the artificial intelligence-based analytics engine) can be used to perform live face detection, which can include detection of one or more facial expressions, mouth and eye and/or gaze tracking, and live motion detection, including movement of the student's hand(s), head, and/or other relevant body parts. In at least one embodiment, live facial expression detection can include using a library such as OpenCV/TensorFlow, via its Frontal Face Classifier to first detect a human face. Next, all other irrelevant parts of the video frame images will be cropped out. Next, a Haar Cascade can be applied to the cropped frames captured to detect one or more facial features. Subsequently, the score of the features within the frames are compared to a set of baseline scores for different types of expressions to make a final determination.

At least one embodiment can also include utilizing other measurements of student engagement with instruction content such as, for example, number of clicks, length of time spent on certain material, number of repeat visits to certain portions of the content, frequency of use of certain features, etc.

Also, one or more embodiments can utilize (e.g., via processing by the artificial intelligence-based analytics engine) one or more learning goals of the student, one or more educational standards associated with the course, student and/or educational body, etc. Such data can be processed and/or incorporated, for example, to help target and/or generated a personalized curriculum for the student.

Additionally or alternatively, one or more embodiments can include generating a learning trail recording and analysis, which indicates what each student knows and/or has learned, and what each student needs to learn, enabling instruction to be tailored to individual learning needs of particular students. Such an embodiment can also include determining and/or identifying one or more learning styles associated with and/or preferred by each student, in connection with measuring and/or scoring students on different levels and/or types of learning (e.g., active versus reflective, sensing versus intuitive, visual versus verbal, sequential versus global, etc.).

For personalized and adaptive learning, adaptive factors of an artificial intelligence-based analytics engine can include student preferences, interests, background and/or prior knowledge, linguistics, past learning records, skills, reactions, learning style(s), characteristics, aptitude tests and/or learning abilities, progress against one or more standards, demographic information, etc. By way of specific example, with respect to personalized linguistics, in at least one embodiment, an artificial intelligence-based instructor avatar can communicate with a given student in the student's native language and/or regional dialect (e.g., without a foreign accent).

As depicted, for example, in FIG. 2, one or more embodiments can include implementing at least one content management system 249. In such an embodiment, a user such as an instructor/educator or a content provider can upload content, which may be, for example, aligned to a particular standard (e.g., a testing standard or a local and/or regional standard). To train a model associated therewith (e.g., in connection with an artificial intelligence-based analytics engine), sample responses to one or more questions within the content may be uploaded as well, and/or the instructor may grade real (anonymized) student content within the system (or otherwise add and/or import their reviews). Learned information (e.g., whether a response was correct or not) from this process can also be used as inputs to inform an artificial intelligence-based instructor avatar's responses. Additionally, users can tag content related to a particular standard or learning outcome, and users may also tag responses with a certain quality level (e.g., meets a standard, does not meet a standard, etc.).

One or more embodiments can determine and/or adhere to an associated curriculum and/or order to the content (e.g., x must be learned before y). Also, some content can be associated with other content, either by a user or programmatically, and may be automatically presented (to a student) at the appropriate time to reinforce learning outcomes. Students can then view the content and submit responses. In some cases, there may be one or multiple pre-determined correct answers; in other cases, text analysis may be required, and an artificial intelligence model can be trained on samples of good and bad responses (e.g., for essays questions/responses). In at least one embodiment, using such an artificial intelligence model can include using reinforcement learning, to look for clustering of the data and their given outcomes, along with using the Markov decision process. With this approach, a process can be broken into a set of steps, and at each step, each possible next step is taken. A score (e.g., a reward) is provided to each step when compared to the desired output, and the path with the highest reward is chosen from that point onward, given similar data.

Further, in connection with content management systems, students can generate and/or maintain profiles that store portfolios of work over time, creating a larger pool of student outcomes to incorporate into the model (e.g., the artificial intelligence-based analytics engine). Over time, clarity can be reached with respect to which instructional content types are most helpful for a particular student, and the artificial intelligence-based instructor avatar can process this information and suggest relevant delivery formats (for the particular student). Also, in one or more embodiments, new content can be automatically generated over time, with the ability for the artificial intelligence-based instructor avatar to review the new content. Over time, the artificial intelligence-based instructor avatar can determine which content areas are likely to be challenging for a particular student, wherein such areas can be flagged for the artificial intelligence-based instructor avatar to spend additional time on with the student.

With respect to interactions between an artificial intelligence-based instructor avatar and students, the artificial intelligence-based instructor avatar can present (to a student), for example, as a variety of options (including, e.g., a virtual cartoon character). In one or more embodiments, users can generate virtual characters (for presentation as avatars) via multiple means. Such means can include, for example, uploading a photo to be used as a basis for generating a cartoon character for the instructor/teacher. Such means can also include assigning a virtual character (to the instructor) based on one or more students preferences, and/or assigning a virtual character (to the instructor) based on which types of avatar are likely to result in better engagement and learning outcomes for the student (determined, for example, by processing historical data).

As detailed herein, during one-on-one teaching, the student and the artificial intelligence-based instructor avatar can interact with each other. For example, the student can ask questions through text, image, video and/or voice input and receive prompt (e.g., immediate) answers from the artificial intelligence-based instructor avatar (as further detailed below in connection with FIG. 3). Additionally, the artificial intelligence-based instructor avatar can monitor the student's engagement status as well as learning inputs and outputs (e.g., the types of questions the students ask, the student's responses to assessment questions, etc.) and can take one or more actions if the artificial intelligence-based instructor avatar determines that the student is lacking attention, having trouble understanding a portion of the instruction content, etc. Further, based on the student's determined level of engagement, the artificial intelligence-based instructor avatar's presented facial expressions can change according to the inputs and/or needs of the student. Additionally, the artificial intelligence-based instructor avatar's output expression and/or tone of response(s) can similarly be modified based at least in part on assessing which types of responses have historically been more helpful for similar scenarios.

As noted above, FIG. 3 shows a flow diagram of interaction between a student 301 and an artificial intelligence-based instructor avatar 314 in an illustrative embodiment. If the student 301 raises a question by voice and/or speech, an automatic speech recognition system 331 processes the question and provides input to at least one speech-to-text algorithm 333, which will transform the speech input to text output. This text output will then serve as an input question to be processed by a knowledge graph-based question answering system (KGQA) 335.

The KGQA 335 will process the input question and generate and output an answer, in text form, to the question. The answer is provided to and/or processed by at least one text-to-speech algorithm 337, which will transform the text-based answer to a speech-based output. The speech-based output can be processed by a translation engine 339 if necessary (e.g., based on preferences of the student) and ultimately communicated to the student 301 by the artificial intelligence-based instructor avatar 314. It is to be appreciated that the above is merely an example implementation, and one or more alternative embodiments can be carried out. For example, based at least in part student needs (e.g., students who do not hear well may prefer visual outputs), one or more embodiments may include omitting the text-to-speech transformation.

In at least one embodiment, the KGQA system 335 can be part of a content management system, or the KGQA system 335 can be an independent system.

Figure 4:
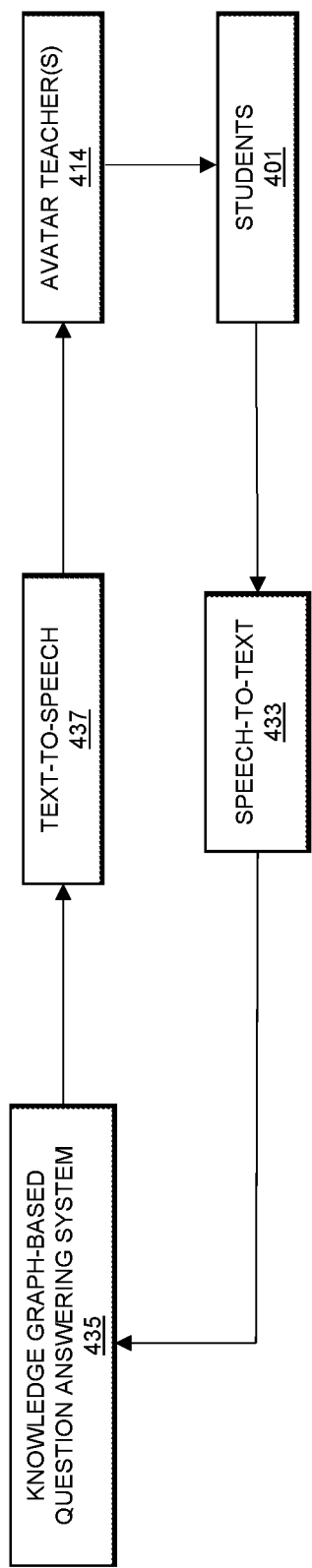
FIG. 4 shows a workflow for assessing student learning effectiveness by asking questions in an illustrative embodiment.

FIG. 4 shows a workflow for assessing student learning effectiveness by asking questions in an illustrative embodiment. By way of illustration, FIG. 4 depicts a KGQA system 435 generating and/or outputting one or more questions, in text form, for student assessment. The output one or more questions are processed by at least one text-to-speech algorithm 437, which will transform the text-based question(s) to one or more speech-based questions (as above, the inclusion of such a transformation step may depend at least in part on student needs). The one or more speech-based questions will then be communicated to the student 401 by artificial intelligence-based instructor avatar 414. Also, in one or more embodiments, one or more customized avatar responses (for example, changes in how the avatar looks or sounds (e.g., in reaction a student answering a question correctly, in response to a student who may not be paying close attention, etc.), based on factors such as cultural norms, student preferences, etc., can be produced in addition to and/or independent of the speech-based questions. In such an embodiment, these types of customized avatar responses, along with their frequency, type, etc., can vary based at least in part on what works best for a given student (e.g., sensory preferences, etc.).

The student 401 can then provide an answer to the question(s) in a speech format, and the at least one speech-to-text algorithm 433 will process the answer and transform the student's speech-based answer into a text format. The answer, in text form, will then be evaluated by the KGQA system 435, which can generate and output feedback to the answer to the artificial intelligence-based instructor avatar 414. In one or more embodiment, the feedback can be transformed to speech and communicated to the student 401 by the artificial intelligence-based instructor avatar 414.

Additionally, in at least one embodiment, students (or other end users) can provide feedback on the avatar's responses (for example, regarding the educational content provided, the avatar's expressions, the avatar's reactions, etc.). Such feedback can then be used to update and/or further train the model and improve the avatar's responses in the future to help maximize the student's sense of engagement, inclusion, and/or learning outcomes. In some embodiments, student feedback to the can also be used in conjunction with actual learning outcomes and/or engagement outcomes to determine and/or adjust how the avatar is presented to the student in the future.

Figure 3:
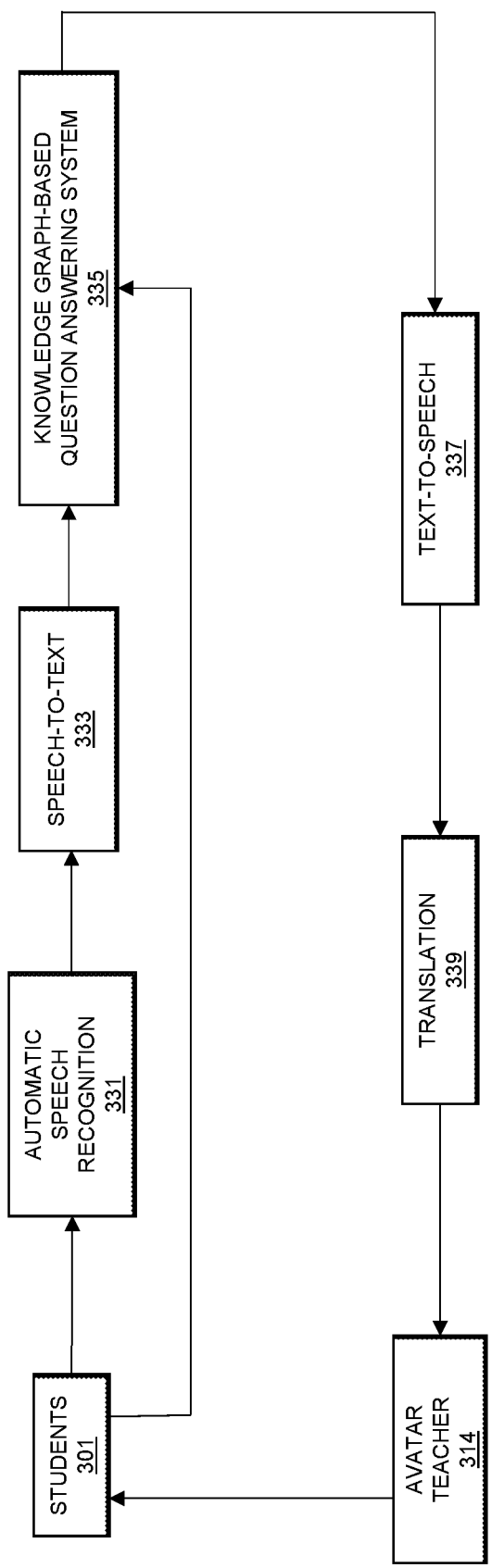
FIG. 3 shows a flow diagram of interaction between a student and an artificial intelligence-based instructor avatar in an illustrative embodiment.

As detailed above in connection with FIG. 3 and FIG. 4, one or more embodiments can include implementing a KGQA, which aims to use data in a knowledge graph to answer natural language questions. A KGQA can help end users more efficiently and more easily access the substantial and valuable knowledge in the corresponding knowledge graph (e.g., without needing to know its data structures). In at least one embodiment, related knowledge graph embedding can include representing each predicate/entity as a low-dimensional vector, such that the relation information in the knowledge graph can be preserved. The learned vectors can benefit various applications such as, for example, knowledge graph completion and recommender systems.

Additionally, in connection with evaluation of a student examination or other course work, at least one embodiment can include implementing optical character recognition (OCR) techniques and/or handwritten text recognition (HTR) algorithms to transform student writing to text using one or more artificial intelligence models. The determined and/or recognized texts can then be sent to a system database for evaluation, and results can be sent to student and/or the artificial intelligence-based instructor avatar.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 5:
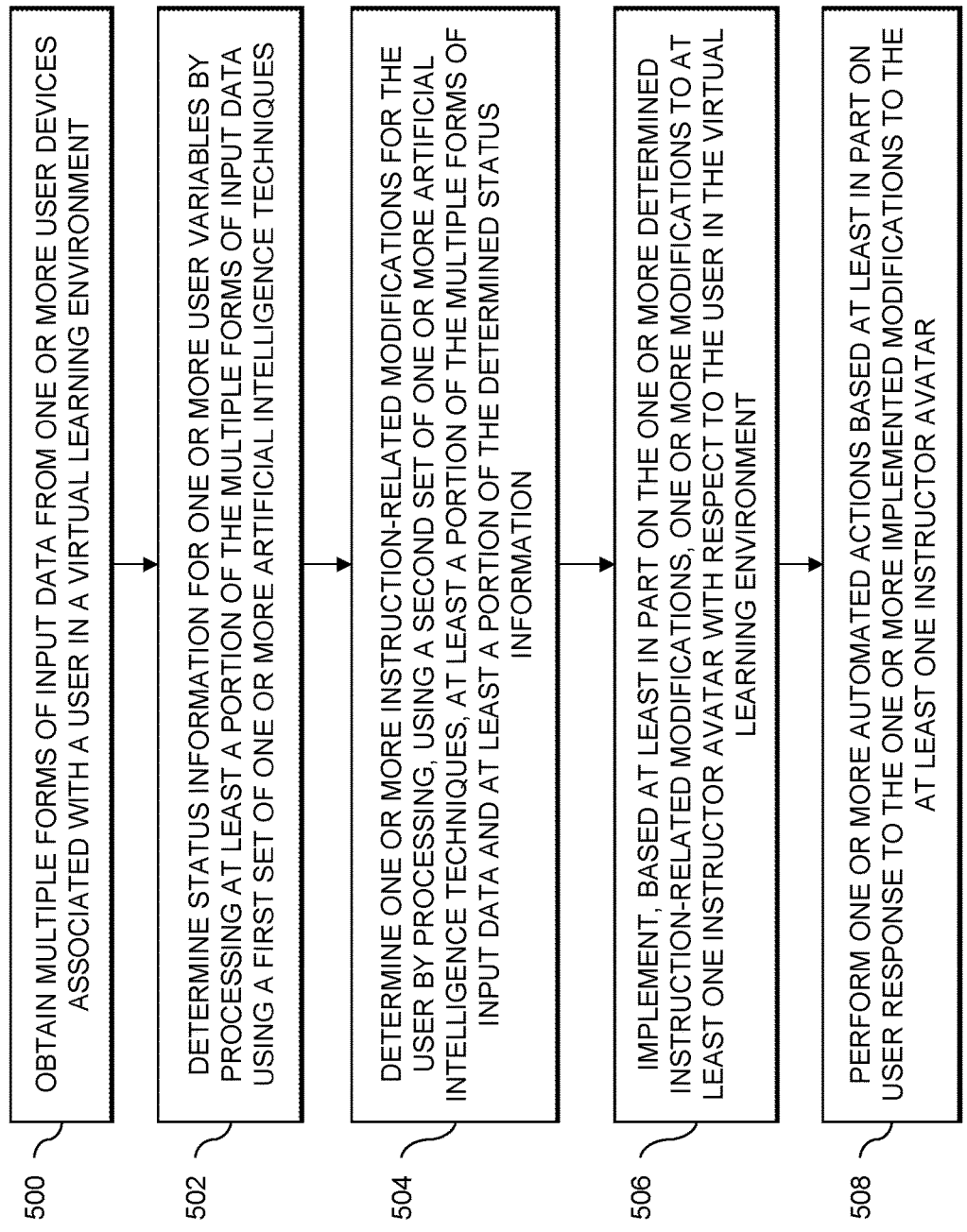
FIG. 5 is a flow diagram of a process for artificial intelligence-driven avatar-based personalized learning techniques in an illustrative embodiment.

FIG. 5 is a flow diagram of a process for artificial intelligence-driven avatar-based personalized learning techniques in an illustrative embodiment. It is to be understood that this particular process is only an example, and additional or alternative processes can be carried out in other embodiments.

In this embodiment, the process includes steps 500 through 508. These steps are assumed to be performed by the dynamic avatar-based personalized learning system 105 utilizing its elements 112, 114 and 116.

Step 500 includes obtaining multiple forms of input data from one or more user devices associated with a user in a virtual learning environment. In one or more embodiments, obtaining multiple forms of input data from one or more user devices associated with a user in a virtual learning environment includes obtaining multiple forms of input data from one or more of at least one camera associated with the user, at least one Internet of Things sensors associated with the user, and at least one wearable device worn by the user.

Step 502 includes determining status information for one or more user variables by processing at least a portion of the multiple forms of input data using a first set of one or more artificial intelligence techniques (e.g., one or more computer vision algorithms such as detailed herein). In at least one embodiment, determining status information for one or more user variables includes detecting one or more facial expressions of the user by processing at least a portion of the multiple forms of input data using one or more computer vision algorithms. In such an embodiment, determining status information for one or more user variables can include determining at least one emotional status of the user based at least in part on the one or more detected facial expressions. Additionally or alternatively, determining status information for one or more user variables can include detecting one or more body movements of the user by processing at least a portion of the multiple forms of input data using one or more computer vision algorithms. In such an embodiment, determining status information for one or more user variables can include determining a level of user engagement with instruction in the virtual learning environment based at least in part on the one or more detected body movements.

Step 504 includes determining one or more instruction-related modifications for the user by processing, using a second set of one or more artificial intelligence techniques (e.g., one or more reinforcement learning techniques and/or trained models such as detailed herein), at least a portion of the multiple forms of input data and at least a portion of the determined status information. In one or more embodiments, determining one or more instruction-related modifications for the user includes determining one or more learning patterns attributed to the user by processing user data related to one or more of historical performance, user background information, one or more user preferences, information pertaining to time spent learning by the user, and information pertaining to repeat activity within the virtual learning environment by the user.

Step 506 includes implementing, based at least in part on the one or more determined instruction-related modifications, one or more modifications to at least one instructor avatar with respect to the user in the virtual learning environment. In one or more embodiments, implementing one or more modifications to at least one instructor avatar includes configuring communication to the user through the at least one instructor avatar in a language preferred by the user, modifying at least one facial expression exhibited by the at least one instructor avatar to the user, and/or modifying a tone of communication output from the at least one instructor avatar to the user.

Step 508 includes performing one or more automated actions based at least in part on user response to the one or more implemented modifications to the at least one instructor avatar. In at least one embodiment, performing one or more automated actions includes automatically training, using at least a portion of the user response, at least one of the first set of one or more artificial intelligence techniques and the second set of one or more artificial intelligence.

Additionally, in at least one embodiment, the first set of one or more artificial intelligence techniques can include the same one or more artificial intelligence techniques as the second set of one or more artificial intelligence techniques. Alternatively, in one or more embodiments, the first set of one or more artificial intelligence techniques can include a distinct set of one or more artificial intelligence techniques from the second set of one or more artificial intelligence techniques.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to implement dynamic artificial intelligence-driven avatar-based personalized learning techniques. These and other embodiments can effectively overcome problems associated with static conventional education approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
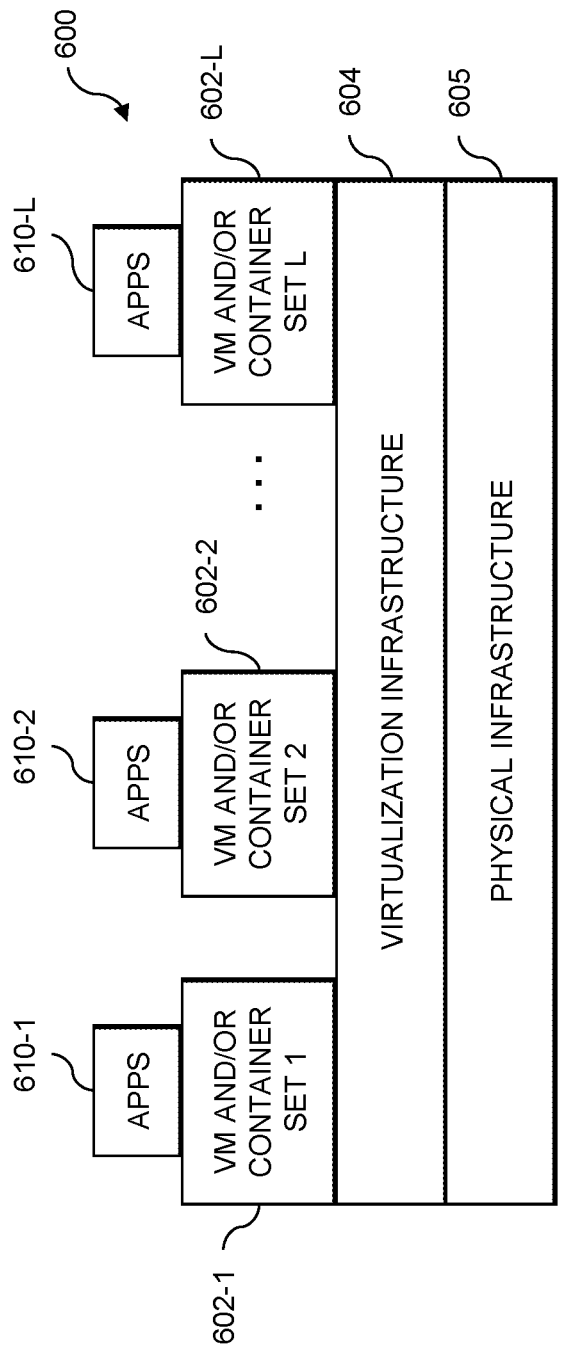
FIGS. 6 and 7 show examples of processing platforms that may be utilized to implement at least a portion of an information processing system in illustrative embodiments.
Figure 7:
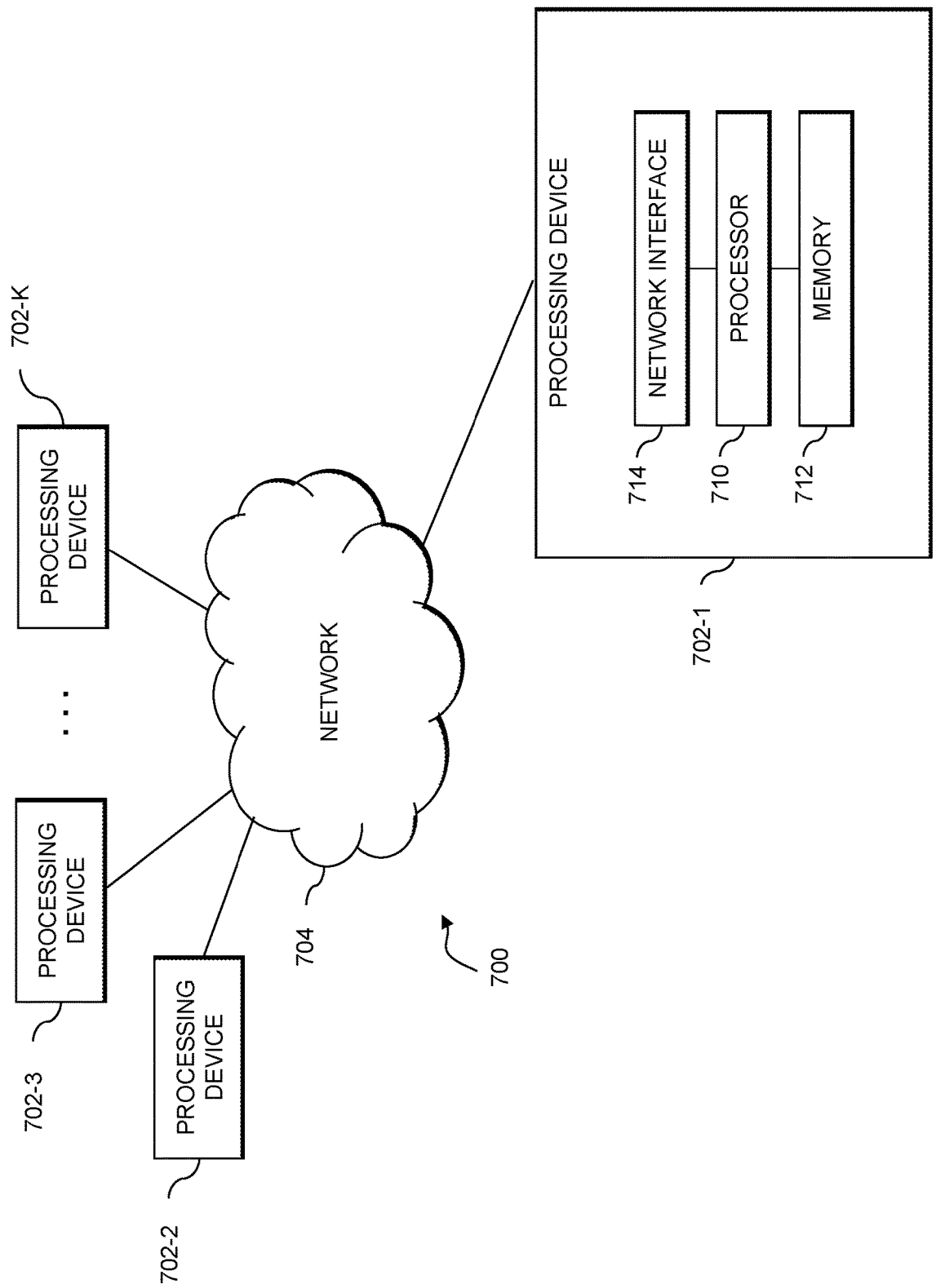

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a CPU, a GPU, a TPU, a microcontroller, an ASIC, a FPGA or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining multiple forms of input data from one or more user devices associated with a plurality of users in at least one virtual learning environment;
determining status information for one or more user variables by processing at least a portion of the multiple forms of input data using a first set of one or more artificial intelligence techniques, wherein determining status information for one or more user variables comprises detecting at least one of one or more facial expressions of each of the plurality of users and one or more body movements of each of the plurality of users by processing at least a portion of the input data using one or more computer vision algorithms, comprising performing, for each of the plurality of users, a first object detection operation for detecting one or more portions of a human face attributed to the user, and performing, for each of the plurality of users, a second object detection operation, different from the first object detection operation, for detecting one or more other portions of a human body attributed to the user, using one or more artificial intelligence-related libraries associated with object detection, filtering out at least a portion of the input data unrelated to the object detection, and applying at least one object feature detection algorithm to the filtered input data;
determining one or more instruction-related modifications for each of the plurality of users by processing, using a second set of one or more artificial intelligence techniques, at least a portion of the multiple forms of input data and at least a portion of the determined status information, wherein determining one or more instruction-related modifications for each of the plurality of users comprises dynamically generating new content related to at least one area of instruction identified as requiring additional time for additional instruction for the respective user, and wherein dynamically generating new content comprises processing data in at least one knowledge graph, related to the at least one virtual learning environment, to generate and answer natural language questions, wherein the at least one knowledge graph comprises knowledge graph embeddings representing multiple predicates as vectors of one or more designated dimensions;
implementing, based at least in part on the one or more determined instruction-related modifications, one or more modifications to at least one instructor avatar with respect to each of the plurality of users in the at least one virtual learning environment, wherein implementing one or more modifications to at least one instructor avatar comprises configuring communication to each of the plurality of users through the at least one instructor avatar in a language preferred by each of the plurality of users; and
performing one or more automated actions based at least in part on user response to the one or more implemented modifications to the at least one instructor avatar;
wherein the method is performed by at least one processing device comprising a processor coupled to a memory.

2. The computer-implemented method of claim 1, wherein determining status information for one or more user variables comprises determining at least one emotional status of each of the plurality of users based at least in part on the one or more detected facial expressions.

3. The computer-implemented method of claim 1, wherein determining status information for one or more user variables comprises determining a level of user engagement with instruction in the at least one virtual learning environment based at least in part on the one or more detected body movements.

4. The computer-implemented method of claim 1, wherein implementing one or more modifications to at least one instructor avatar comprises modifying at least one facial expression exhibited by the at least one instructor avatar to each of the plurality of users.

5. The computer-implemented method of claim 1, wherein implementing one or more modifications to at least one instructor avatar comprises modifying a tone of communication output from the at least one instructor avatar to each of the plurality of users.

6. The computer-implemented method of claim 1, wherein performing one or more automated actions comprises automatically training, using at least a portion of the user response, at least one of the first set of one or more artificial intelligence techniques and the second set of one or more artificial intelligence techniques.

7. The computer-implemented method of claim 1, wherein determining one or more instruction-related modifications for each of the plurality of users comprises determining one or more learning patterns attributed to each of the plurality of users by processing user data related to one or more of historical performance, user background information, one or more user preferences, information pertaining to time spent learning by each of the plurality of users, and information pertaining to repeat activity within the at least one virtual learning environment by each of the plurality of users.

8. The computer-implemented method of claim 1, wherein obtaining multiple forms of input data from one or more user devices associated with a plurality of users in at least one virtual learning environment comprises obtaining multiple forms of input data from one or more of at least one camera associated with each of the plurality of users, at least one Internet of Things sensors associated with each of the plurality of users, and at least one wearable device worn by each of the plurality of users.

9. The computer-implemented method of claim 1, wherein the first set of one or more artificial intelligence techniques comprises the same one or more artificial intelligence techniques as the second set of one or more artificial intelligence techniques.

10. The computer-implemented method of claim 1, wherein the first set of one or more artificial intelligence techniques comprises a distinct set of one or more artificial intelligence techniques from the second set of one or more artificial intelligence techniques.

11. A non-transitory processor-readable storage medium having stored therein program code of one or more software programs, wherein the program code when executed by at least one processing device causes the at least one processing device:
to obtain multiple forms of input data from one or more user devices associated with a plurality of users in at least one virtual learning environment;
to determine status information for one or more user variables by processing at least a portion of the multiple forms of input data using a first set of one or more artificial intelligence techniques, wherein determining status information for one or more user variables comprises detecting at least one of one or more facial expressions of each of the plurality of users and one or more body movements of each of the plurality of users by processing at least a portion of the input data using one or more computer vision algorithms, comprising performing, for each of the plurality of users, a first object detection operation for detecting one or more portions of a human face attributed to the user, and performing, for each of the plurality of users, a second object detection operation, different from the first object detection operation, for detecting one or more other portions of a human body attributed to the user, using one or more artificial intelligence-related libraries associated with object detection, filtering out at least a portion of the input data unrelated to the object detection, and applying at least one object feature detection algorithm to the filtered input data;
to determine one or more instruction-related modifications for each of the plurality of users by processing, using a second set of one or more artificial intelligence techniques, at least a portion of the multiple forms of input data and at least a portion of the determined status information, wherein determining one or more instruction-related modifications for each of the plurality of users comprises dynamically generating new content related to at least one area of instruction identified as requiring additional time for additional instruction for the respective user, and wherein dynamically generating new content comprises processing data in at least one knowledge graph, related to the at least one virtual learning environment, to generate and answer natural language questions, wherein the at least one knowledge graph comprises knowledge graph embeddings representing multiple predicates as vectors of one or more designated dimensions;
to implement, based at least in part on the one or more determined instruction-related modifications, one or more modifications to at least one instructor avatar with respect to each of the plurality of users in the at least one virtual learning environment, wherein implementing one or more modifications to at least one instructor avatar comprises configuring communication to each of the plurality of users through the at least one instructor avatar in a language preferred by each of the plurality of users; and
to perform one or more automated actions based at least in part on user response to the one or more implemented modifications to the at least one instructor avatar.

12. The non-transitory processor-readable storage medium of claim 11, wherein determining status information for one or more user variables comprises determining at least one emotional status of each of the plurality of users based at least in part on the one or more detected facial expressions.

13. The non-transitory processor-readable storage medium of claim 11, wherein determining status information for one or more user variables comprises determining a level of user engagement with instruction in the at least one virtual learning environment based at least in part on the one or more detected body movements.

14. The non-transitory processor-readable storage medium of claim 11, wherein implementing one or more modifications to at least one instructor avatar comprises modifying at least one facial expression exhibited by the at least one instructor avatar to each of the plurality of users.

15. The non-transitory processor-readable storage medium of claim 11, wherein implementing one or more modifications to at least one instructor avatar comprises modifying a tone of communication output from the at least one instructor avatar to each of the plurality of users.

16. An apparatus comprising:
at least one processing device comprising a processor coupled to a memory;
the at least one processing device being configured:
to obtain multiple forms of input data from one or more user devices associated with a plurality of users in at least one virtual learning environment;
to determine status information for one or more user variables by processing at least a portion of the multiple forms of input data using a first set of one or more artificial intelligence techniques, wherein determining status information for one or more user variables comprises detecting at least one of one or more facial expressions of each of the plurality of users and one or more body movements of each of the plurality of users by processing at least a portion of the input data using one or more computer vision algorithms, comprising performing, for each of the plurality of users, a first object detection operation for detecting one or more portions of a human face attributed to the user, and performing, for each of the plurality of users, a second object detection operation, different from the first object detection operation, for detecting one or more other portions of a human body attributed to the user, using one or more artificial intelligence-related libraries associated with object detection, filtering out at least a portion of the input data unrelated to the object detection, and applying at least one object feature detection algorithm to the filtered input data;

to determine one or more instruction-related modifications for each of the plurality of users by processing, using a second set of one or more artificial intelligence techniques, at least a portion of the multiple forms of input data and at least a portion of the determined status information, wherein determining one or more instruction-related modifications for each of the plurality of users comprises dynamically generating new content related to at least one area of instruction identified as requiring additional time for additional instruction for the respective user, and wherein dynamically generating new content comprises processing data in at least one knowledge graph, related to the at least one virtual learning environment, to generate and answer natural language questions, wherein the at least one knowledge graph comprises knowledge graph embeddings representing multiple predicates as vectors of one or more designated dimensions;

to implement, based at least in part on the one or more determined instruction-related modifications, one or more modifications to at least one instructor avatar with respect to each of the plurality of users in the at least one virtual learning environment, wherein implementing one or more modifications to at least one instructor avatar comprises configuring communication to each of the plurality of users through the at least one instructor avatar in a language preferred by each of the plurality of users; and to perform one or more automated actions based at least in part on user response to the one or more implemented modifications to the at least one instructor avatar.

17. The apparatus of claim 16, wherein implementing one or more modifications to at least one instructor avatar comprises modifying at least one facial expression exhibited by the at least one instructor avatar to the each of the plurality of users.

18. The apparatus of claim 16, wherein implementing one or more modifications to at least one instructor avatar comprises modifying a tone of communication output from the at least one instructor avatar to each of the plurality of users.

19. The apparatus of claim 16, wherein determining status information for one or more user variables comprises determining at least one emotional status of each of the plurality of users based at least in part on the one or more detected facial expressions.

20. The apparatus of claim 16, wherein determining status information for one or more user variables comprises determining a level of user engagement with instruction in the at least one virtual learning environment based at least in part on the one or more detected body movements.

* * * * *